Nov. 12, 1957 J. F. SCULLY ET AL 2,813,261

PLAYBACK CIRCUIT

Filed Jan. 4, 1954 2 Sheets-Sheet 1

INVENTORS: RICHARD J. LAMANNA
JOHN F. SCULLY
BY William L. Glover
AGENT

PLAYBACK CIRCUIT

Filed Jan. 4, 1954 2 Sheets-Sheet 2

INVENTORS: RICHARD J. LAMANNA
JOHN F. SCULLY
BY William S Glover
AGENT

United States Patent Office 2,813,261

Patented Nov. 12, 1957

2,813,261

PLAYBACK CIRCUIT

John F. Scully, Glen Gardner, and Richard J. La Manna, Morristown, N. J., assignors to Monroe Calculating Machine Company, Orange, N. J., a corporation of Delaware Application January 4, 1954, Serial No. 402,119

8 Claims. (Cl. 340—174)

This invention relates to magnetic recording, especially magnetic spot recording as practiced in electronic computers and other data processing devices, and is particularly concerned with means for reproducing magnetically recorded data.

One of the most common of the magnetic recording devices found in electronic computers and the like is a magnetic drum consisting of a rotating cylinder having a magnetizable peripheral surface which is divided, theoretically, into a series of contiguous circumferential tracks or channels. Data is recorded on the drum, one or more words per channel, through the media of recording heads, each located in immediate proximity to the surface of a said channel. Assuming the rotational speed of the drum to be constant, each revolution thereof consumes a definite number of equal time periods during each of which a different spot, cell or area of each channel is located adjacent the associated recording head for magnetization thereby. Usually spots are magnetized with one polarity to represent binary one and with the opposite polarity to represent binary zero. Each channel may also be provided with a playback head to effect reproduction of the data recorded in the channel; but where the number of channels is large, this involves considerable expense. Instead, the recording head for each channel is also used as a playback head, and switching means are provided for connecting each head alternatively with a recording circuit or a playback circuit, depending on which operation is desired. The record circuit, of course, is a power circuit adapted to apply a relatively large current pulse to the head to effect recording. On the other hand, the playback circuit is a relatively sensitive amplifier and detector adapted to amplify the minute "sine-wave-like" signals induced in the head as the magnetized spots move by the pole piece gap thereof, and to detect the identity of said signals, that is, to determine whether the same represent binary one or binary zero. The identity detection means may be in the form of a coincidence circuit which is conditioned for operation by accurately timed sense or playback pulses which occur, during each time period, at the same time as that at which the peak of either the leading or lagging lobe of the playback signal, whichever is more convenient, is applied to the coincidence circuit. The polarity of said peak which, of course, is dependent on the polarity of the magnetic spot which effected generation of the same, determines the mode of operation of the coincidence circuit and the output of the latter signifies binary one or binary zero as the case may be. This arrangement, of course, necessitates accurate placement of the magnetized spots if the coincident action discussed above is to be obtained during each and every time period. Such accuracy is readily obtained by using sharp recording pulses having a fixed relation to the sense or playback pulses to time the operations of the recording circuits.

The magnetic drum system just above described operates satisfactorily except when an attempt is made to play back with one head while recording with an adjacent head. When this mode of operation is attempted the signals induced in the playback head as the result of magnetized spots passing thereby, are swamped by noise induced in the head by interference flux radiated from the recording head. The noise to signal ratio has been found to be as high as 4000 to 1 (60 volt noise, 15 mv. signal) with the heads spaced apart 1 cm.

Known methods for coping with this noise problem involve the use of elaborate shielding and so-called "bucking pole pieces" which are arranged to be affected only by the radiated flux and not by the magnetized spots, and which have their coils wound oppositely to the coils of the playback heads so that the noise induced in one of the former cancels that induced in one of the latter when the two are connected in series. Another method is to space the interfering heads as far apart as possible. None of these methods has proven entirely satisfactory. Elaborate shielding and spacing apart of the interfering heads pose mechanical problems which sometimes make these methods impractical. And the use of bucking pole pieces is complicated by the difficulty of locating a bucking pole piece in a position wherein it is not affected at all by the magnetized spots but in which it is affected to the same extent as the associated playback head by the radiated flux.

Another method of coping with the noise problem consists in operating the playback detection means, before or after the noise is applied thereto, to sense the early or late portion of the playback signal. This method has not proven entirely satisfactory because the noise persists for some time after the termination of the recording signal which initiates the same, and, also, because noise of large magnitude causes the playback amplifiers, which are designed to amplify the relatively minute playback signals, to draw rather large grid currents which charge the condensers of the RC couplings to the amplifier grids. The RC couplings are also designed to accommodate the relatively minute playback signals and as a result have relatively large time constants which make it impossible for the condensers to discharge prior to the application of the next playback signal to the amplifiers. This, of course, severely limits the control which may be exercised over the amplifiers by the playback signals, if, in fact, the latter are not entirely nullified by the charges on the condensers.

The principal object of the present invention, therefore, is to provide a playback circuit capable of amplifying the minute playback signals induced in the associated head and detecting the identity thereof (binary one or binary zero), while attenuating and discarding any noise induced in the head as the result of radiated flux even though said noise is of much greater magnitude than the said signals.

According to the invention a magnetic recording playback circuit comprising an amplifying section and a detector section adapted to identify playback signals as binary one or binary zero is provided with noise suppression means adapted to severely attenuate noise of greater magnitude than the playback signals, and the detector circuit is arranged and adapted to be controlled by synchronizing recording signals to effect frequency discrimination between the playback signals and noise which is initiated by said signals. In a preferred form, the noise suppression circuit includes a pair of differentially oriented crystal diodes connected in series and a second pair of differentially oriented crystal diodes connected in parallel and shunting the first pair. The input is to one of the diodes of the first pair and is referenced to ground or to some other potential level. The parallel diodes are also referenced to ground or said other potential level and the output of the circuit is from the connection of the series and parallel diode pairs. The principle of operation of the circuit is founded on the characteristic of known crystal diodes, that the same exhibit a constant resistance in the region of zero bias thereof. A less preferred form of noise suppression circuit includes only the series connected diodes. Buffer means may also be provided to protect the diode suppression circuit from noise or the like which exceeds the rated capacity of the diodes.

The invention also contemplates that the diode suppression circuits may be used not only in connection with magnetic recording but in any system or circuit wherein it is desired to distinguish between noise of large magnitude and minute signals of less magnitude than required to move the operating points of the diodes substantially beyond the said constant resistance, zero bias region thereof.

Other objects and features of the invention will become apparent from the following description when read in the light of the drawings of which:

Before entering into a detailed description of the playback means of the invention, it is believed advisable first to discuss the recording of magnetized spots and the nature of the spots themselves.

The recording means include, in addition to the recording head, amplifying and coincidence detection means controlled by comparatively low level binary one and binary zero data signals and by sharp synchronizing recording signals, to produce accurately timed pulses of short duration and of sufficient magnitude to operate the recording head to record binary ones or binary zeros. Hereinafter these pulses will be called "data recording pulses." Preferably the coincidence detection means are embodied in the last amplifier stage so that there is a minimum time delay, or no delay, between the occurrence of a recording signal and the application of the resultant data recording pulse to the recording head.

Figure 3:
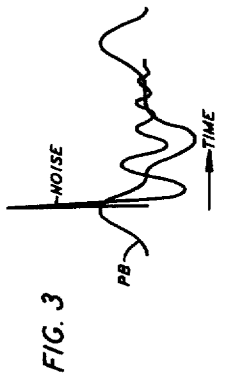
Fig. 3 is an idealized wave diagram illustrating a playback signal with noise superimposed thereon.

Each recording head comprises a coil to which the said data recording pulses are applied to effect current flow in opposite directions for binary one and binary zero, and a core or pole piece on which the coil is wound, said pole piece being so mounted that a narrow air gap therein is located in close proximity to the magnetizable surface of the drum. Preferably the air gap and the spacing of the pole piece from the surface of the drum are of the order of approximately .001–.003 inch. Because of the proximity of the pole piece air gap to the magnetizable surface of the drum, leakage flux at the air gap passes through said surface and permanently magnetizes a minute spot or area thereof each time a data recording pulse is applied to the coil. The polarity of the magnetized spot is, of course, dependent on the direction in which the flux flows in the pole piece. Due to spreading of the leakage flux beyond the narrow width of the air gap, the size of the spot which is magnetized at any instant is greater than the width of the air gap. Further, as the drum is rotating during the finite time for which flux flows in the head in response to a data recording signal, the overall size of a magnetized spot is substantially greater than the width of the air gap. Therefore, when on a subsequent rotation of the drum, the recording head is used as a playback head, the leading lobe of the signal induced in the coil of the head as said spot moves by the latter, begins some time before the associated recording signal occurs and the lagging lobe of the signal ends some time after the latter does. This relation is shown diagrammatically in Fig. 3 wherein the noise resulting from a recording operation with one head, is superimposed on the playback signal induced in an adjacent head. The large sharp peak of the noise represents the data recording pulse applied to the recording head and occurs at substantially the same time thereas. It is to be noted that, whereas in Fig. 3 this sharp noise peak occurs a short time after the peak of the leading lobe of the playback wave, it may occur coincidentally with the peak of the latter, or before said peak, or later than shown in Fig. 3. It is also to be noted that, as shown in Fig. 3, the noise persists for some time after the sharp peak thereof occurs.

Preferably the recording signals which time the operations of the recording heads are produced by suitable pulse generating means 5 (Fig. 1) under control of the output of the playback circuit 6 for a master channel or track A of the drum which contains a full complement of magnetized spots. In the following description it will be assumed that the recording signals are of 2–6 microseconds in duration and have a repetition rate of 10,000 cycles per second. It will also be assumed that the density of the magnetized spots in each channel is approximately 16 per peripherial inch and that interfering record and playback heads are spaced apart approximately one centimeter. Further, a playback signal indicative of binary one is assumed to have a positive leading lobe while a signal indicative of binary zero has a negative leading lobe. It is to be understood, of course, that these assumptions are made to facilitate an understanding of the invention and are not to be construed as limiting the scope thereof.

Figure 1:
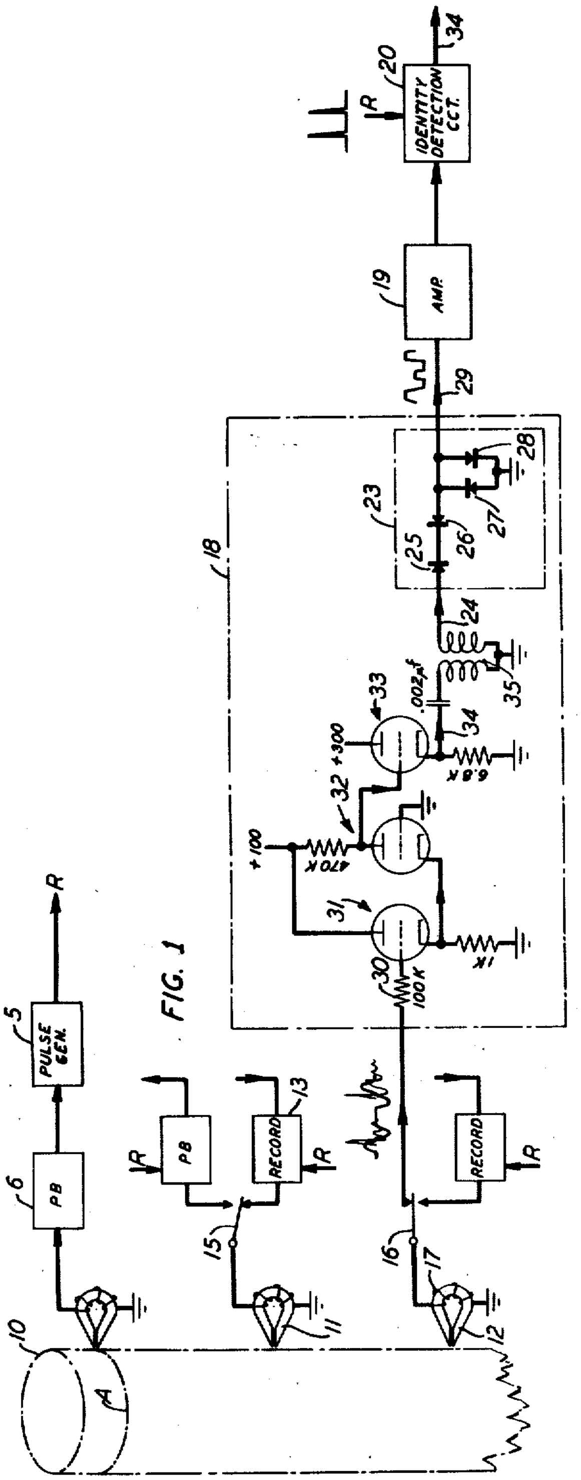
Fig. 1 is a combined block and schematic wiring diagram of the means of the invention.

Referring to Fig. 1, there is illustrated a magnetic drum 10 having a pair of reading-recording heads 11 and 12 associated therewith. For purposes of description, head 11 is shown as being under the control of a record circuit 13 while head 12 is shown as cooperating with the playback circuit of the invention, although it will be understood that each head may be connectable at will either with a record circuit or a playback circuit through the medium of suitable switches such as the switches 15 and 16.

The playback circuit of the invention may be divided into three sections, namely, a noise clipping circuit 18 which serves to attenuate or clip noise superimposed on a playback signal, an amplifier 19, and an identity detection circuit 20, wherein each playback signal is identified as representing binary one or binary zero.

Noise clipping circuit 18 utilizes amplitude discrimination to distinguish between the low level playback signals and the high level noise superimposed thereon. For the most part this is accomplished by a novel crystal diode network 23 which includes four diodes 25, 26, 27 and 28 connected as shown in Fig. 1, and which is capable of greatly attenuating or clipping noise while not affecting the associated signals to any great degree where the former are of the order of magnitude of tens of volts and the latter are only a few (say 30) millivolts. Preferably germanium diodes which exhibit a constant resistance throughout a small (say 50 millivolts) bias region are used, although other diodes having similar characteristics may be used.

The principle of operation of the diode network 23 is based on the peculiar characteristic of germanium diodes that the forward and back resistances thereof are approximately equal and of the order of a few thousand ohms in the region of zero bias, but are substantially different and of the order of tens of ohms and hundreds of thousands of ohms, respectively, under high level signal conditions.

Referring to Fig. 1, diodes 25 and 26 of the network 23 are connected in series, cathode to cathode, between an input line 24 and an output line 29 and diodes 27 and 28 are connected in parallel between output line 29 and ground with their electrodes oppositely oriented. If desired, the diodes 25 and 26 may be reversed, that is, connected plate-to-plate.

Figure 5:
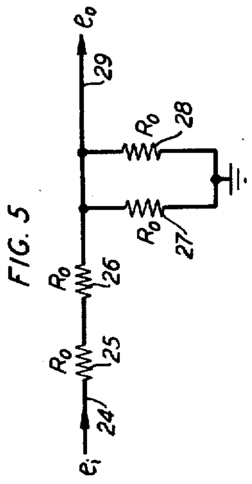
Fig. 5 is an equivalent circuit of the diode network of Fig. 1 under conditions of low level voltage input (near zero)

The equivalent circuit for the diode network 23 with all diodes in the zero bias region, i. e. under conditions of low level signal input (a few millivolts), is shown in Fig. 5, wherein $R_0$ (zero bias region resistance) is of the order of a few thousand ohms. Assuming that the zero bias region resistances $R_0$ for the diodes 25, 26, 27 and 28 are equal, the circuits reduces to a simple voltage divider whose output voltage $e_o$ is equal to the input voltage $e_i$ divided by 5.

$$(1) \qquad e_o=\frac{e_i}{5}$$

Figure 6:
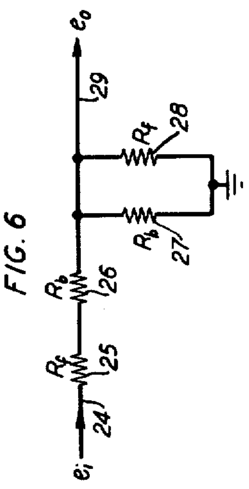
Fig. 6 is an equivalent circuit of the diode network of Fig. 1 under conditions of high level voltage input.

The equivalent circuit for the network under high level (tens of volts) signal input conditions is shown in Fig. 6 wherein $R_b$ (back resistance) is of the order of hundreds of thousands of ohms and $R_f$ (forward resistance) is of the order of tens of ohms. An analysis of the circuit reveals that the output voltage $e_o$ thereof is approximately equal to the input voltage $e_i$ multiplied by the factor $$\frac{R_f}{R_b}$$

$$(2) \qquad e_i \cong e_o\frac{R_f}{R_b}$$

Assuming, for example, that a substantially sinusoidal, 50 millivolt-peak-to-peak signal having noise of the order of 50 volts peak-to-peak superimposed thereon is applied to the diode network, the signal and the noise are affected as follows: Substituting in Equations 1 and 2

$$e_o=\frac{.050}{5}=10 \text{ millivolts signal}$$

$$e_o \cong 50\frac{(10^2)}{(10^6)}=5 \text{ millivolts noise}$$

it will be seen, therefore, that the noise is attenuated by a factor of 1,000 while the signal is attenuated by a factor of only 5.

The measure of merit for the diode network is the ratio of noise attenuation to signal attenuation which may be represented as $$\frac{R_b}{5R_f}$$

Thus, when $R_b=1{,}000{,}000$ ohms and $R_f=100$ ohms, the measure of merit is 2000 to 1.

This ratio of noise attenuation to signal attenuation can be increased by using diodes which provide a higher ratio of $R_b/R_f$ or by using shunt diodes 27 and 28 which have a higher zero bias region resistance $R_0$ than the diodes 25 and 26. This latter change, of course, effects a lowering in value of the denominator in Equation 1 above and therefore a lessening in signal attenuation. The change does not, however, effect any change in noise attenuation which is dependent only on the ratio $R_b/R_f$.

In summation, therefore, the ratio $R_b/R_f$ should be as great as possible to obtain maximum noise attenuation, the zero bias region resistance $R_0$ for the series diodes should be as small as possible for a given ratio $R_b/R_f$, and the zero bias region resistance $R_0$ of the shunt diodes should be as high as possible relative to resistance $R_0$ of the series diodes to obtain a minimum of signal attenuation.

In those instances wherein the degree of noise suppression that is required or desired is not so great as in the described instance of the invention, a modification of the described diode network which includes only the differentially oriented, series diodes 25 and 26 may be used. This modified network functions in much the same manner as the described arrangement but is not as effective as the latter.

At this point it is deemed desirable to point out that whereas in the present instance the diode network 23 is embodied in a magnetic recording system playback circuit, the same is also useful in many other systems and circuits wherein it is desired to separate a minute signal from noise of much greater magnitude which is superimposed thereon. Specifically, network 23 may be used in any connection wherein its input and output lines can be referenced to a common potential level, the latter through diodes 27 and 28, and wherein the signals which are to be separated from the noise superimposed thereon, are of less magnitude than is required to move the operating points of the diodes of the network beyond the limits of the constant resistance, zero bias region thereof, say about 50 millivolts peak-to-peak.

Referring again to the playback circuit of Fig. 1 the the diode network may, in some instances, be connected directly to the record-playback head with which it is associated, but preferably it is connected to the said head through buffer circuits. When the diode network is connected in the former manner, care must be taken that the magnitude of the noise induced in the reading-recording head does not exceed the maximum rating of the diodes of the network. Also in those instances wherein both record and playback circuits are connected directly to the head and separated only by gating, the record pulses applied to the head are also applied to the diode circuit through the gating and care must be taken to insure that the diodes are not harmed thereby.

A suitable buffer or preamplifier circuit adapted to protect the diode network 23 is shown in Fig. 1 and comprises three triodes 31, 32 and 33, and a transformer 35. The grid of triode 31 is connected via a grid limiting resistor 30 to the coil 17 of reading-recording head 12. The anode of triode 31 is connected to a source of positive potential, say +100 volts, and the cathode thereof is connected to ground through a suitable resistor. The output of the triode is taken from its cathode in the usual, cathode follower manner. The input impedance of triode 31 combines with grid limiting resistor 30 to form a voltage divider which decreases the magnitude of both the signals and the noise transmitted from head 12. Additionally, because of the large magnitude of the noise, grid current flows in the triode and effects grid clipping which decreases the magnitude of the noise to a safe level. The playback signals, however, are unaffected by this grid clipping due to their extremely small magnitude. It will be seen, therefore, that in this first stage of free amplifier or buffer, a substantial gain in signal to noise ratio is effected.

The output of cathode follower 31 is applied to the cathode of triode 32 which is connected as a grounded grid amplifier. This amplifier serves to amplify both noise and signal and its output is applied to the grid of triode 33 which is connected as a cathode follower and serves to provide a low output impedance for driving transformer 35. It is to be noted that triodes 31, 32 and 33 are D. C. coupled to one another and to the coil 17 of reading-recording head 12. The reason for this is that the magnitude of the noise in this portion of the circuit is such that the condensers of A. C. couplings would be swamped, that is, charged to the extent that they could not recover in time to be controlled in the normal manner by subsequent playback signals.

The output of cathode follower 33 is applied to the primary of transformer 35 through a coupling condenser which is not subject to the swamping discussed above because its low impedance discharge path provides for a short RC time constant. The chief purpose of this condenser is to prevent saturation of transformer 35 by the D. C. output of the cathode follower, and thus where a transformer not subject to saturation by the cathode follower is available, the condenser may be eliminated.

The primary and secondary of transformer 35 are connected in common to ground, and the secondary is also connected via line 24 to the diode network 23 discussed above. The purpose of transformer 35 is to provide a low driving impedance for the diode network 23 and to provide a D. C. coupling between input line 24 of the diode network and ground. Of course, where it is desired to reference the input and output lines of the diode network to some potential other than ground, the primary and secondary of transformer 35 are connected to a source of said other potential.

The described noise clipping circuit 18 is capable of effecting extremely large gains in signal to noise ratio where the signals are of the order of a few millivolts and the noise is of the order of tens of volts. For example, using the circuit components indicated in Fig. 1, the application of a 50 millivolt signal on which 50 volts of noise is superimposed, results in the application to output line 29 of the circuit of a 50 millivolt signal on which noise in the order of 100 millivolts is superimposed. The gain in signal to noise ratio in this instance is approximately 500 to 1.

Amplifier 19 of the circuit of Fig. 1 may be of any suitable sort adapted to amplify the signals applied thereto sufficiently to effect proper control of the identity detecting circuit 20. The latter may be of any suitable sort capable of differentiating between playback signals representative of binary one and binary zero and applying appropriate signals to an output line 34 thereof. Preferably, the detector circuit includes phase discriminatory means which enable the circuit to detect the identity of each playback signal prior to the arrival thereat of the noise which is superimposed on said signal. This may be accomplished by using the synchronizing recording signals which initiate generation of the noise to enable the detection means for operation and where necessary or desired, by including frequency discriminative RC circuits or the like to delay noise more than the playback signals as the same are transmitted to the detector.

Figure 2:
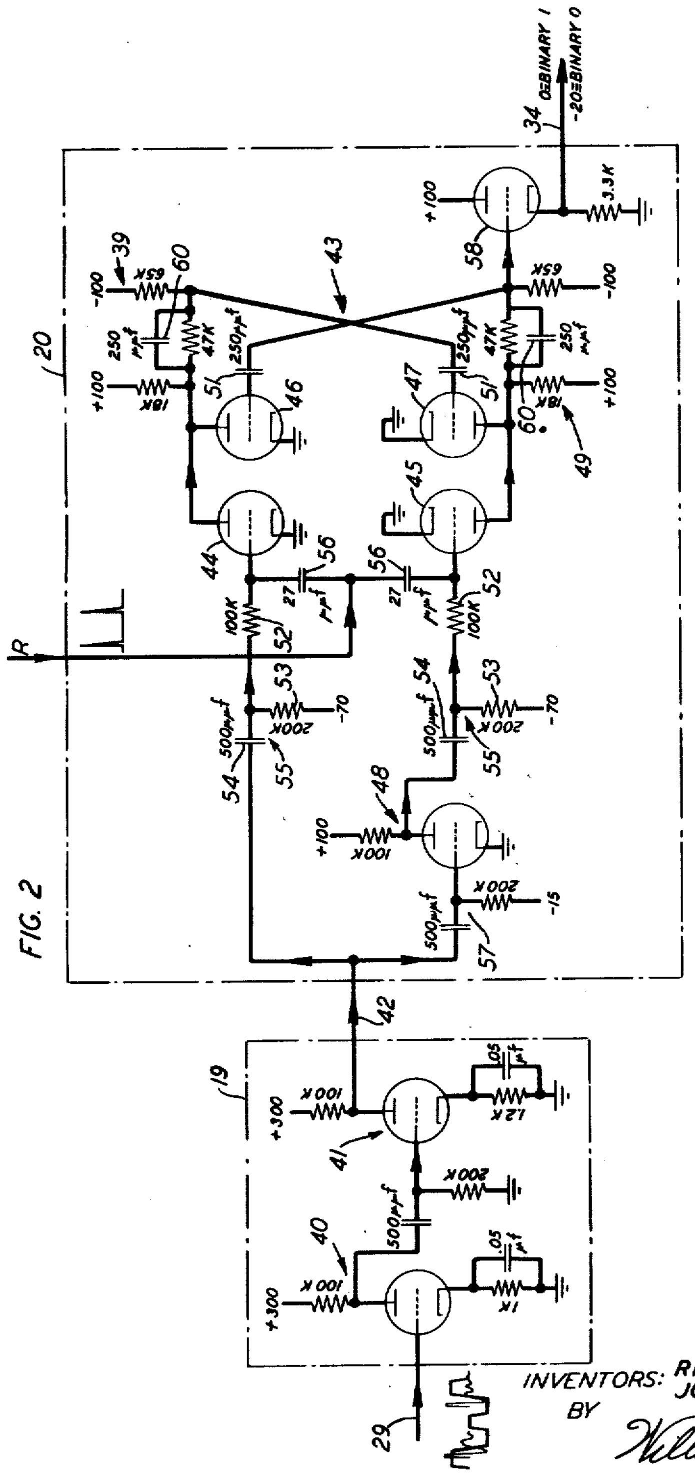
Fig. 2 is a detailed wiring diagram of means illustrated in block form in Fig. 1.

A preferred amplifier 19 and identity detection circuit 20 are illustrated in Fig. 2 wherein it will be seen that amplifier comprises a pair of RC coupled triode amplifiers 40 and 41. The signals applied to the amplifier via the diode network 23 are not the pseudo sinusoidal playback signals induced in winding 17 of coil 12 (Fig. 1) but rather are somewhat square in form due to the clipping action of the diode network. Assuming, for example, that playback signals of the order of 50 millivolts peak-to-peak having noise of the order of 100 millivolts peak-to-peak superimposed thereon are applied to the amplifier 19 illustrated in Fig. 2, the same applies to its output line 42 a 90 volt peak-to-peak signal having noise of substantially the same magnitude superimposed thereon. The noise, of course, is not amplified but rather is reduced somewhat due to clipping action of the amplifiers. This clipping action also serves to square up the playback signals which had already been squared somewhat by clipping in the diode network. Thus the signals which are applied to output line 42 of the amplifier circuit are substantially square waves. Preferably a said square wave having a positively directed leading lobe indicates a binary one whereas a square wave having a negatively directed leading lobe signifies binary zero.

Identity detection circuit 20 includes a pair of coincidence gates each comprising a resistor 52 and a condenser 56 connected to the grid of a triode 44 or 45. Preferably the synchronizing recording signals are applied to the condensers 56 while the playback signals from amplifier 19 are applied through an A. C. coupling 55 to the resistor 52 associated with triode 44, and the inversion of said signals are applied through another A. C. coupling 55 to the resistor 52 associated with triode 45. Each of the A. C. couplings 55 includes a resistor 53 and a condenser 54. The inversion of the playback signals is provided by an inverter triode 48 to which the playback signals are applied through an A. C. coupling 57 Triodes 44 and 45 are normally maintained non-conductive by means of a bias applied through the resistors 53 of the A. C. couplings 55. On application of a binary one playback signal to the identity detection circuit 20, its positively directed leading lobe counteracts part of the bias applied to resistor 53 associated with triode 44 and, assuming that a synchronizing recording signal occurs during the span of said leading lobe, the said bias is completely overcome and triode 44 conducts. It is necessary, of course, to select a bias which is compatible with the magnitudes of the signals which are to overcome it. At the same time said leading lobe effects conduction of inverter 48 which applies a negative going signal to the coupling associated with triode 45 and the latter remains non-conducting. However, on application of a binary zero signal to the identity detection circuit its negatively directed leading lobe effects cut-off of the inverter 48 and a positively directed signal is applied to the associated coupling 55 to counteract part of the bias for tube 45. Then, on the occurrence of the synchronizing recording signal during the span of said leading lobe, inverter 45 conducts. At the same time the negatively directed leading lobe of the binary zero signal maintains triode 44 non-conducting.

It is believed evident, therefore, that triode 44 conducts only when a binary one playback signal is applied to the identity detection circuit, and then only during the span of the associated synchronizing recording signal, and that the triode 45 conducts only during coincident application to the circuit of a said recording signal and a binary zero signal.

At this point it is belived desirable to point out how the playback signals are distinguished from the noise at the coincidence gates 52, 56 of identity detection circuit 20. To begin with, the said coincidence gates as described, are controlled in part by the synchronizing recording signals which initiate the generation of the noise associated with each playback signal. Inasmuch as each playback signal which is induced in the winding 17 of the reading-recording head begins some short time before the occurence of the associated synchronizing recording signal, it is possible, for the identity detection circuit to identify the same under control of the synchronizing signals before the noise initiated by the latter is transmitted through the playback circuit to the detector circuit. Due to practical difficulties, it has been found that more satisfactory results are obtained if the playback circuit effects a time delay of signals and noise between the reading-recording head and the detecting means, particularly a frequency discriminative delay which effects a longer delay of the higher frequency noise than it does of the playback signals. It will readily be seen that an arrangement of this sort insures that the detector gates 44 and 45 can be operated to detect the identity of each playback signal before the noise associated with the said signals reaches the same. If desired, this frequency discriminative delay may be provided by a LC delay line, or the like, included in the circuit of any appropriate point. However, it has been found that sufficient delay may be effected by the RC circuits comprising the anode resistors of the amplifiers of the playback circuit and stray capacitance between the same and ground, and also by the RC components of the coincidence circuits.

Figure 4:
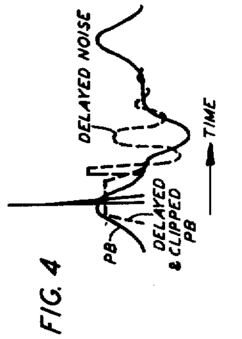
Fig. 4 is an idealized wave diagram similar to Fig. 2 but illustrates the relative positions of noise and playback waves after they have been delayed differentially.

The operation of the frequency discriminative delay means is illustrated diagrammatically in Figs. 3 and 4. Fig. 3 merely illustrates the playback signal with the noise superimposed thereon. Fig. 4, however, illustrates the playback signal as it appears originally and also as it appears after having been clipped and having been delayed somewhat in transit to the coincidence detectors 52, 56. The former state is shown in full lines and the latter state in dotted lines, with no attempt being made to illustrate relative magnitudes. Fig. 4 also includes, in full lines, the initial peak of the noise superimposed on the playback signal and also, in dotted lines, the delayed and clipped version of said peak which appears at the detectors 52, 56. It is believed evident that the noise is delayed somewhat more than the playback signal and that, assuming the noise peak shown in full lines of Fig. 4 to be the synchronizing recording signal which initiates the same, that said signal occurs at the peak of the leading lobe of the delayed playback signal as the latter is applied to said coincidence detector.

Triodes 44 and 45 serve as pullers to set and reset a bi-stable flip-flop 43 comprising a pair of triodes 46 and 47 each having its cathode grounded, its grid connected to the center tap of a voltage divider 39 or 49 and its anode connected to the juncture of the two positivemost sections of the opposite voltage dividers 49 or 39. Each voltage divider is connected between sources of + and −100 volts. Flip-flop 43 also includes condensers 60 connected across the center resistors of the voltage dividers 39 and 49 to speed up transitions between the two states of the flip-flop. Flip-flop 43 may also conveniently include condensers 51 in its anode-grid cross connections. The pullers 44 and 45 are connected anode to anode with the triodes 46 and 47 of the flip-flops, respectively, and conduction of the puller associated with the non-conducting flip-flop triode, effects lowering of the potential of the center tap of the associated voltage divider 39 or 49. This, of course, cuts off the other triode 46 or 47 of the flip-flop which, in turn, effects application of a high potential to the other flip-flop triode and the latter becomes conductive. Conduction of the puller 44 or 45 associated with a conducting triode 46 and 47 has no effect on the state of the flip-flop. Inasmuch as flip-flop 43 and the pullers therefor are more or less standard circuits, it is not deemed necessary to described the same further.

In order to prevent loading of the flip-flop 43 by whatever circuitry is to be controlled by the playback signals, the center tap of the voltage divider 49, which, using the components indicated in Fig. 2 assumes a potential of zero volts to represent a binary one and a potential of −20 volts to represent binary zero, is connected to the grid of a cathode follower 58. An output line 34, which assumes a potential of approximately zero volts to indicate binary one and a potential of approximately −20 volts to represent binary zero, is extended from the cathode follower 58 in the usual manner.

While there has been above described but a single embodiment of the invention, it is to be understood that many changes and modifications may be made therein without departing from the spirit of the invention and it is not desired, therefore, to limit the scope of the invention except as pointed out in the appended claims or as dictated by the prior art.

We claim:

1. In a magnetic recording system playback circuit, the combination of a playback head, a cathode follower driven by said head, a grid limiting resistor connected between said head and the grid of said cathode follower, a grounded grid amplifier controlled by said cathode follower, a second cathode follower controlled by said grounded grid amplifier, a transformer driven by said second cathode follower, an amplifying means, a first pair of oppositely oriented diodes connected in series between one terminal of the secondary of said transformer and said amplifying means, a source of potential connected to the other terminal of the secondary of said tarnsformer, and a second pair of oppositely oriented diodes connected in parallel between the other terminal of the secondary of said transformer and the junction of said first pair of series connected diodes and said amplifying means, said diodes having a substantially constant resistance characteristic in the zero bias region thereof.

2. A magnetic recording system playback circuit capable of amplifying a signal induced in the coil of a playback head and of determining the identity thereof as binary one or binary zero while suppressing noise of greater magnitude and greater frequency which is superimposed on said playback signal, comprising a cathode follower driven by said coil, a current limiting grid resistor connected between said coil and said cathode follower, a grounded grid amplifier controlled by said cathode follower, a second cathode follower controlled by said grounded grid amplifier, a transformer driven by said second cathode follower, an amplitude discriminative diode network connected to the secondary of said transformer for control by the signals and noise originally induced in said coil and adapted to attenuate the noise in far greater proportion than the signal, the network diodes having a constant resistance characteristic in the zero bias region thereof, an amplifier driven by said diode network, and an identity detection circuit to which the output of said amplifier is applied for identification as binary one or binary zero.

3. The combination according to claim 2 including a source of reference potential to which the primary and secondary of said transformer are connected, and wherein said diode network comprises a first pair of oppositely polarized diodes connected in series between said transformer and said amplifier, and a second pair of oppositely polarized crystal diodes connected in parallel between the juncture of said series diodes with said amplifier and said source of reference potential.

4. The combination according to claim 3 including means for producing synchronizing pulses which initiate generation of the noise and are synchronized with the playback signals and wherein said identity detection circuit comprises a first coincidence detector jointly controlled by the output of said amplifier and by the synchronizing pulses, an inverter driven by the output of said amplifier, a second coincidence detector jointly controlled by the output of said inverter and said synchronizing pulses, A. C. couplings between said amplifier and the first said detector and the inverter and between said inverter and said second detector, means effecting a time delay of noise transmitted between said diode network and the detectors, whereby the noise appears at the detectors later than the synchronizing pulse which initiates generation thereof, a bi-stable flip-flop controlled by said first and second coincidence detectors, a cathode follower controlled by said flip-flop, and an output line extended from said cathode follower.

5. The combination according to claim 4 wherein the delay means comprise a plurality of RC circuits and each consisting of an anode resistor and the stray capacitance between the same and ground.

6. The combination of a magnetic drum on which data is recorded in the form of magnetized spots in each of a plurality of contiguous peripheral channels, a recording and playback head for at least a pair of said channels, each head including a coil which is pulsed to magnetize spots in its associated channel and in which signals are induced by the magnetized spots, a recording circuit connected with one of said heads to pulse same, means for producing sharp synchronizing recording signals to time the operation of said recording circuit, and a playback circuit connected to the other head and capable of amplifying a playback signal induced in the coil of said head and of determining the identity of said signal as binary one or binary zero while suppressing noise of greater magnitude and greater frequency which is superimposed on said playback signal, said playback circuit comprising an amplitude discriminative diode network connected to attenuate the noise in much greater proportion than the playbacks signal, an amplifier driven by said diode network, a first coincidence detector jointly controlled by the output of said amplifier and by said sharp recording signals, an inverter driven by the output of said amplifier, a second coincidence detector jointly controlled by the output of said inverter and said record signals, delay means interposed between said diode network and the detectors, whereby the noise is not applied to the detectors until after termination of the associated sharp record pulses, a bi-stable flip-flop controlled by said first and second coincidence detectors and a cathode follower controlled by said flip-flop.

7. The combination according to claim 6 wherein said diode network comprises a first pair of oppositely polarized diodes connected in series between said head and said amplifier, and a second pair of oppositely polarized diodes connected in a closed loop and shunting the first pair, said diodes having a constant resistance characteristic in the region of zero bias thereof.

8. The combination according to claim 7 including a buffer circuit connected between said head and said diode network and comprising a cathode follower driven by said head, a current limiting grid resistor inserted between said head and said cathode follower, a grounded grid amplifier controlled by said cathode follower, a second cathode follower controlled by said grounded grid amplifier, and a transformer driven by said second cathode follower.

References Cited in the file of this patent

UNITED STATES PATENTS

| | | |
|---|---|---|
| 2,281,395 | Travis | Apr. 28, 1942 |
| 2,285,044 | Morris | June 2, 1942 |
| 2,685,682 | Sepahban | Aug. 3, 1954 |

FOREIGN PATENTS

| | | |
|---|---|---|
| 653,574 | Germany | Nov. 27, 1937 |

OTHER REFERENCES

Publication, Proc. of IRE, May 1935, page 638.

UNITED STATES PATENT OFFICE

Certificate of Correction

Patent No. 2,813,261

November 12, 1957

John F. Scully et al.

It is hereby certified that error appears in the printed specification of the above numbered patent requiring correction and that the said Letters Patent should read as corrected below.

Column 5, lines 26 and 27, equation (2), should appear as shown below instead of as in the patent:

$$e_0 \cong e_i \frac{R_f}{R_b}$$

Signed and sealed this 28th day of January 1958.

[SEAL]

Attest:

KARL H. AXLINE,
*Attesting Officer.*

ROBERT C. WATSON,
*Commissioner of Patents.*